J. A. MAYNARD.
WATERING TROUGH.
APPLICATION FILED JULY 24, 1914.
1,150,051.
Patented Aug. 17, 1915.
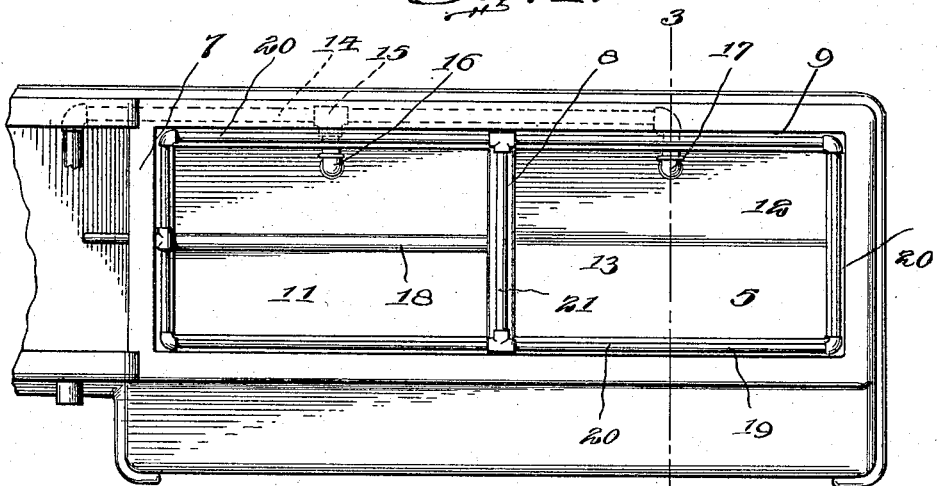
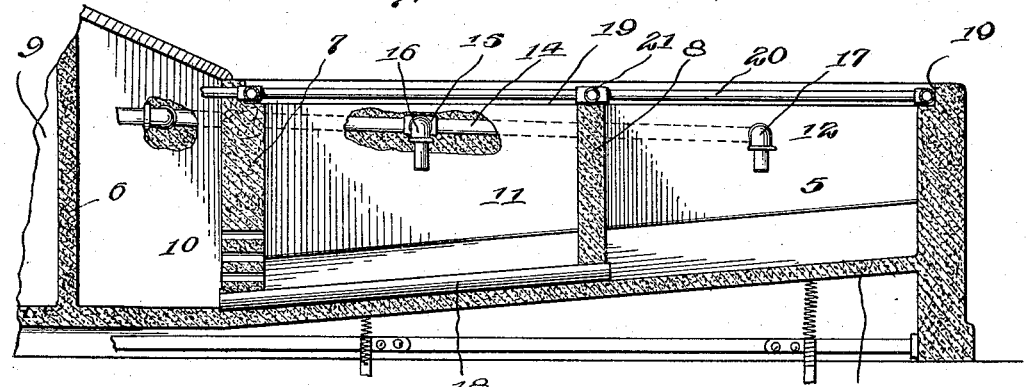
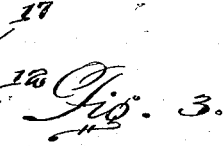
Witnesses
Frederick L. Fox
Inventor
Joseph A. Maynard.
By Victor J. Evans
Attorney

UNITED STATES PATENT OFFICE.

JOSEPH A. MAYNARD, OF RAVENA, NEW YORK.

WATERING-TROUGH.

1,150,051.    Specification of Letters Patent.    Patented Aug. 17, 1915.

Application filed July 24, 1914. Serial No. 852,849.

*To all whom it may concern:*

Be it known that I, JOSEPH A. MAYNARD, a citizen of the United States, residing at Ravena, in the county of Albany and State of New York, have invented new and useful Improvements in Watering-Troughs, of which the following is a specification.

The object of the invention is the provision of a watering trough wherein the construction thereof is generally improved over the type of trough forming the subject matter of an application for Letters Patent filed by me on or about the 14th day of March, 1914, and serially numbered 824,708.

With this and other objects in view, the invention consists in the construction, combination and arrangement of parts as will be hereinafter fully described, illustrated in the accompanying drawing, and pointed out in the claim hereunto appended.

In the drawing: Figure 1 is a fragmentary top plan view of a trough constructed in accordance with the invention. Fig. 2 is a vertical longitudinal sectional view therethrough. Fig. 3 is a sectional view on the line 3—3 of Fig. 1.

Similar reference characters indicate corresponding parts throughout the several views in the drawing.

Referring to the drawing in detail, the watering trough comprises a hollow body 5 which is preferably made from cement, the edges of which are rounded so as to avoid sharp edges which would result in injury to the animal when drinking from the trough. The body is formed with vertical transversely disposed partitions 6, 7 and 8, dividing the body into a chamber 9, water reservoir 10, and independent drinking compartments 11 and 12, respectively, the chamber 9 being designed to receive the valve mechanism for controlling the water supply, forming the subject matter of my co-pending application filed on or about March 14, 1914, and serially numbered 824,708, the bottom 13 of the body 5 being inclined in the direction of the water reservoir 10, while embedded in one side wall of the said body is a water supply pipe 14 having at one point therein a T-union 15, to which is connected an elbow pipe 16, the same depending within the compartment 11 for discharging water thereto, while at the outer free end of the said pipe 13 is an elbow pipe 17, the latter depending within the compartment 12 for discharging water into the same. The other or inner end of the pipe 14 is suitably connected with a water main which is extended into the chamber 9. Leading to the water reservoir 10 and superimposed upon the inclined bottom 13 of the body 5 is a pipe 18 which leads from the compartment 12 so that water therein can be drained through the pipe 18 into the reservoir 10 when water is being let out of the latter.

The bottom 13 of the body 5 is substantthat water therein con be drained through draining of the compartments 11 and 12 in the direction of the water reservoir 10, the partitions 7 being perforated so that water from the said reservoir will be admitted to the compartment 11, while formed in the upper edge of the said body 5 is a groove 19 forming a seat for receiving the rectangular-shaped spraying frame 20, which is formed from piping having perforations so that water discharged therefrom will flow down the inner faces of the walls of the body 5. The frame 20 medially thereof is formed with a cross pipe 21 having perforations 22 at diametrically opposite points so that water will be discharged from opposite sides thereof and flow down the faces of the partition 8 for the cleaning of the exposed faces of the said partition. By spraying the trough in this manner the same is rendered thoroughly sanitary, the control of the water supply through the pipe 14 to the reservoir 10 and through the spraying frame 20 being controlled by means of the valve mechanism forming the subject-matter of my co-pending application hereinbefore mentioned.

From the foregoing description, taken in connection with the accompanying drawing, it is thought that the construction of the device will be clearly understood, and therefore a more extended explanation has been omitted.

What is claimed is:—

A water trough comprising a body having a plurality of partitions therein forming a water reservoir and independent drinking compartments, a pipe extended from the water reservoir through one of the compartments and opening into the other compartment for establishing communication between the latter and the said water reservoir, the bottom of the drinking compartments being correspondingly inclined toward the reservoir.

In testimony whereof I affix my signature in presence of two witnesses.

JOSEPH A. MAYNARD.

Witnesses:
 HOWARD O'DELL,
 WILLET STEPHENS.

Copies of this patent may be obtained for five cents each, by addressing the "Commissioner of Patents, Washington, D. C."